(12) United States Patent
Delince et al.

(10) Patent No.: US 12,394,985 B2
(45) Date of Patent: Aug. 19, 2025

(54) CONTROLLING AN ENERGY STORAGE SYSTEM

(71) Applicant: HITACHI ENERGY LTD, Zürich (CH)

(72) Inventors: Francois Delince, Biesme (BE); Henri Bonhomme, Frasnes lez Gosselies (BE); Sebastien Massin, Masnuy-Saint-Jean (BE); Stéphane Van Audenhaege, Beauvechain (BE)

(73) Assignee: HITACHI ENERGY LTD, Zurich (CH)

(*) Notice: Subject to any disclaimer, the term of this patent is extended or adjusted under 35 U.S.C. 154(b) by 0 days.

(21) Appl. No.: 16/331,813

(22) PCT Filed: Sep. 25, 2017

(86) PCT No.: PCT/EP2017/074201
§ 371 (c)(1),
(2) Date: Mar. 8, 2019

(87) PCT Pub. No.: WO2018/060128
PCT Pub. Date: Apr. 5, 2018

(65) Prior Publication Data
US 2019/0341799 A1    Nov. 7, 2019

(30) Foreign Application Priority Data

Sep. 30, 2016  (EP) .................................... 16191857

(51) Int. Cl.
*H02J 3/32*  (2006.01)
*G05B 15/02*  (2006.01)
(Continued)

(52) U.S. Cl.
CPC ................ *H02J 3/32* (2013.01); *G05B 15/02* (2013.01); *H02J 3/008* (2013.01); *H02J 3/16* (2013.01); *H02J 7/0071* (2020.01)

(58) Field of Classification Search
CPC ...................................................... H02J 7/041
See application file for complete search history.

(56) References Cited

U.S. PATENT DOCUMENTS

| 2003/0201990 A1 | 10/2003 | Aldrich et al. |
| 2012/0119579 A1* | 5/2012 | Jin ........................... H02J 3/28 307/60 |

(Continued)

FOREIGN PATENT DOCUMENTS

| CN | 1203472 A | 12/1998 |
| CN | 1662943 A | 8/2005 |

(Continued)

OTHER PUBLICATIONS

European Extended Search Report Application No. 16191857.8 Completed: Mar. 15, 2017; Mailing Date: Mar. 23, 2017 7 Pages.

(Continued)

*Primary Examiner* — Tynese V McDaniel
(74) *Attorney, Agent, or Firm* — Sage Patent Group

(57) ABSTRACT

It is provided a control device for controlling an energy storage system having an energy storage device, a bidirectional AC/DC converter and a grid connection to an electrical power distribution grid. The control device includes: a processor; an external memory interface for reading external instructions from an external removable memory device; a control interface for controlling the energy storage system; and an internal memory. The internal memory stores internal instructions that, when executed by the processor, cause the control device to provide access to the control interface for external instructions, read from the external removable (Continued)

memory device, when the external instructions are executed by the processor.

19 Claims, 2 Drawing Sheets

(51) Int. Cl.
*H02J 3/00* (2006.01)
*H02J 3/16* (2006.01)
*H02J 7/00* (2006.01)

(56) References Cited

U.S. PATENT DOCUMENTS

| | | | |
|---|---|---|---|
| 2012/0248873 A1 | 10/2012 | Oudalov et al. | |
| 2013/0311684 A1* | 11/2013 | Dabbiere | G06F 13/14 |
| | | | 710/36 |
| 2014/0020244 A1* | 1/2014 | Carlson | H01L 31/02021 |
| | | | 29/825 |
| 2014/0203077 A1 | 7/2014 | Gadh et al. | |
| 2014/0347016 A1 | 11/2014 | Becker et al. | |
| 2016/0123620 A1* | 5/2016 | Orsini | H05K 7/20836 |
| | | | 700/276 |
| 2016/0179062 A1* | 6/2016 | Marchione | G05G 9/047 |
| | | | 700/85 |
| 2016/0293206 A1* | 10/2016 | Dunn | G09G 5/14 |
| 2017/0096002 A1* | 4/2017 | Koerner | B41J 2/165 |
| 2017/0256975 A1* | 9/2017 | Aikawa | H02J 3/14 |

FOREIGN PATENT DOCUMENTS

| | | |
|---|---|---|
| CN | 102084569 A | 6/2011 |
| CN | 104012162 A | 8/2014 |

OTHER PUBLICATIONS

International Preliminary Report on Patentability Application No. PCT/EP2017/074201 Completed: Dec. 21, 2018 12 Pages.
International Search Report & Written Opinion of the International Searching Authority Application No. PCT/EP2017/074201 Completed: Dec. 19, 2017; Mailing Date: Jan. 5, 2018 17 Pages.
Chinese Office Action, Search Report and Translation Application No. 2017800601096 Completed: Sep. 10, 2019 10 pages.
Korean Office Action and Translation Application No. 10-2019-7007607 Completed: Oct. 1, 2019 9 pages.
Chinese Search Report dated Jul. 8, 2020 for Chinese Patent Application No. 201780060109.6, 3 pages (including English translation).
Indian Examination Report dated Jun. 12, 2020 for Indian Patent Application No. 201947012133, 5 pages.

* cited by examiner

CONTROLLING AN ENERGY STORAGE SYSTEM

TECHNICAL FIELD

The invention relates to a control device, a method, a computer program and a computer program product for controlling an energy storage system.

BACKGROUND

Electrical power distribution grids are used for distribution of power between energy suppliers and energy consumers. The grids are typically AC (Alternating Current) grids and are constantly subjected to varying conditions in terms of supply of power, consumption of power, faults, etc.

Energy storage system, comprising energy storage, such as batteries, can be used by energy consumers and energy suppliers to better control the power exchanges with the electrical power distribution grid, in terms of power level (active and/or reactive), frequency and can even be used to time shift power consumption or power supply.

Such energy storage systems need to be controlled properly to achieve the desired function. Hence, a control device with a user interface is often provided with the energy storage system to allow the owner of the energy storage system to configure its function.

Each owner of the energy storage system may wish to apply their own logic on how the energy storage system is to be controlled. However, the supplier of the energy storage system can only provide a certain number of programs. It would be an unreasonable situation if the supplier of the energy storage system were to provide a new operation scheme each time a user requests a new control strategy for the energy storage system.

SUMMARY

It is an object to provide greater flexibility of how the control device of an energy storage system is to function.

According to a first aspect, it is provided a control device for controlling an energy storage system comprising an energy storage device, a bidirectional AC/DC converter and a grid connection to an electrical power distribution grid. The control device comprises: a processor; an external memory interface for reading external instructions from an external removable memory device; a control interface for controlling the energy storage system; and an internal memory. The internal memory stores internal instructions that, when executed by the processor, cause the control device to provide access to the control interface for external instructions, read from the external removable memory device, when the external instructions are executed by the processor.

The control device may further comprise a user interface device, in which case the internal instructions further comprise instructions that, when executed by the processor, cause the control device to provide access to the user interface device for the external instructions, read from the external removable memory device, when the external instructions are executed by the processor.

The internal instructions may comprise instructions that, when executed by the processor, cause the control device to provide access to a subset of the user interface device for the external instructions.

The control device may further comprise a network interface, in which case the internal instructions further comprise instructions that, when executed by the processor, cause the control device to provide access to the network interface for the external instructions, read from the external removable memory device, when the external instructions are executed by the processor.

The control interface may comprise an interface to read parameters of the energy storage system.

The control interface may comprise an interface to set a set point for the energy storage system.

According to a second aspect, it is provided a method for controlling an energy storage system comprising an energy storage device, a bidirectional AC/DC converter and a grid connection to an electrical power distribution grid. The method is performed in a control device of the energy storage system and comprises the steps of: reading external instructions from an external removable memory via an external memory interface; executing internal instructions from an internal memory to thereby provide access to a control interface, for controlling the energy storage system, for the external instructions; and executing the external instructions.

The step of executing may further comprise executing internal instructions from the internal memory to thereby provide access to a user interface device for the external instructions.

The step of executing may further comprise executing internal instructions from the internal memory to thereby provide access to a network interface for the external instructions.

The control interface may comprise an interface to read parameters of the energy storage system.

The control interface may comprise an interface to set a set point for the energy storage system.

According to a third aspect, it is provided a computer program for controlling an energy storage system comprising an energy storage device, a bidirectional AC/DC converter and a grid connection to an electrical power distribution grid. The computer program comprises computer program code which, when run on a control device of the energy storage system causes the control device to: read external instructions from an external removable memory via an external memory interface; execute internal instructions from an internal memory to thereby provide access to a control interface for controlling the energy storage system for the external instructions; and execute the external instructions.

According to a fourth aspect, it is provided a computer program product comprising a computer program according to the third aspect and a computer readable means on which the computer program is stored.

By allowing the external instructions on the external removable memory to access the control interface and optionally the user interface device and/or the network interface, great flexibility is achieved. The owner of the energy storage system can develop any suitable control scheme and provide this in the external instructions. The control scheme can easily be reprogrammed and provided on a new external removable memory if needed.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
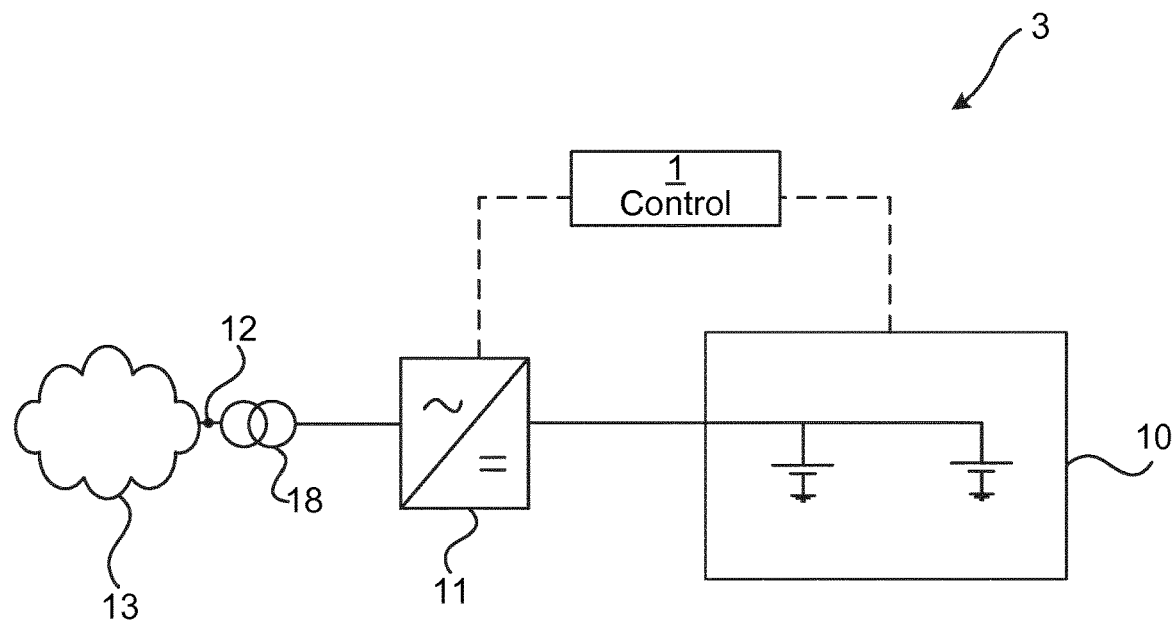
FIG. 1 is a schematic diagram illustrating an environment in which embodiments presented herein can be applied.

FIG. 1 is a schematic diagram illustrating an environment in which embodiments presented herein can be applied. It is here presented an energy storage system 3 which has a grid connection 12 for connection to an electrical power distribution grid 13.

Optionally, a transformer 18 is provided for converting voltage from/to the electrical power distribution grid 13 to a more suitable voltage, eventually for storage in an energy storage device 10.

A bidirectional AC/DC converter 11 is provided for converting AC to DC (Direct Current) and DC to AC. On its AC side, the bidirectional AC/DC converter 11 is connected to the transformer 18, or the grid connection 12 when the transformer 18 is omitted. On its DC side, the bidirectional AC/DC converter 11 is connected to the energy storage device 10. Optionally, a DC filter (not shown) is provided on the DC side of the AC/DC converter 11 and/or an AC filter (not shown) on the AC side of the AC/DC converter 11.

The energy storage device 10 can contain batteries, capacitors, supercapacitors, etc., connected serially when the voltage rating is to be increased or in parallel for providing increased energy storage capacity for a given voltage rating. Optionally, the energy storage device 10 is not electrical per se, and can e.g. be thermal, mechanical, chemical, as long as a converter to and from the DC side of the AC/DC converter 11 is provided.

Devices consuming and/or supplying electrical power can be connected to the grid connector 12.

A control device 1 is connected to the energy storage device 10 and the AC/DC converter to control the operation of the energy storage system 3.

The energy storage system 3 provides great flexibility with regards to how power from the grid 13 is consumed or supplied. One application of the energy storage system 3 is to control active power, and/or reactive power on the grid connection to be within a given range or to always seek a target value. A second application of the energy storage system 3 is for renewable energy suppliers to provide a more even supply of power to the grid. A third application of the energy storage system 3 is for energy consumers to reduce peak energy usage, i.e. storing energy when energy usage is low and consuming energy from storage when energy usage would otherwise exceed a grid power limit. A fourth application of the energy storage system 3 is for energy consumers to store power from the grid at times when energy cost is reduced, and consume power from storage when energy cost is high. A fifth application of the energy storage system 3 is for energy consumers to store power from the grid to be used if a power outage occurs, thus greatly improving reliability of supplied power. Many more applications may arise in the future. Using the embodiments presented herein, great flexibility of control strategies of the energy storage system 3 is provided.

Figure 2:
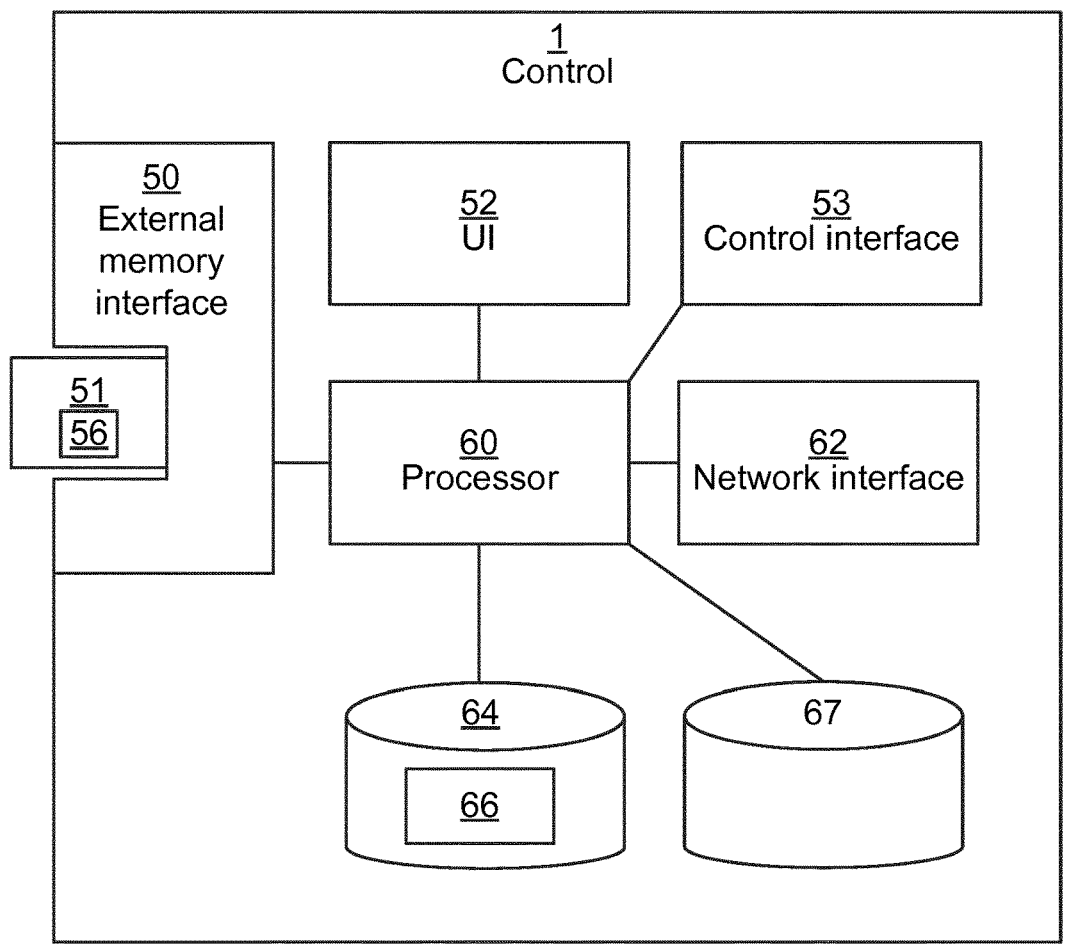
FIG. 2 is a schematic diagram illustrating components of the control device of FIG. 1, which is provided for control of the energy storage system.

FIG. 2 is a schematic diagram illustrating components of the control device 1 of FIG. 1, which is provided for control of the energy storage system 3. A processor 60 is provided using any combination of one or more of a suitable central processing unit (CPU), multiprocessor, microcontroller, digital signal processor (DSP), application specific integrated circuit etc., capable of executing internal software instructions 66 stored in a memory 64, which can thus be a computer program product. The processor 60 can be configured to execute the method described with reference to FIG. 3 below.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 67 is also provided for reading and/or storing data during execution of (internal and/or external) software instructions in the processor 60. The data memory 67 can be any combination of read and write memory (RAM) and read only memory (ROM).

A control interface 53 is configured to communicate with other components of the energy storage system, e.g. the bidirectional AC/DC converter 11 and the energy storage device 10. The control interface 53 can e.g. be based on a CAN (Controller Area Network) bus or a connection through a main control board. The control interface 53 allows the control device to read data, e.g. measurements of voltage, current, frequency, power, temperature, etc., from any connected devices. Moreover, the control interface can send commands of one or more set points to any connected devices (e.g. the bidirectional AC/DC converter 11) to thereby control the operation of the entire energy storage system. The set points can e.g. be active power P and/or reactive power Q. In such a case, a sign of the value can be used indicate whether it is consumption of power or supply of power, e.g. through the bidirectional AC/DC converter.

A network interface 62 allows the control device 1 to communicate with other devices, e.g. over a LAN (Local Area Network) and/or WAN (Wide Area Network), such as the Internet. The network interface 62 can e.g. be based on Ethernet, any of the IEEE 802.11x standards, etc. to allow IP (Internet Protocol) based communication.

A user interface device 52 comprises one or more components to allow an operator to interact with the control device 1. For instance, the user interface device 52 can comprise a touch screen, providing an efficient and intuitive user interface for the operator. Alternatively or additionally, the user interface device 52 can comprise a regular display, a keypad/keyboard, a pointer device, a speaker, a microphone, etc.

An external memory interface 50 allows an external removable memory 51 to be connected to the control device 1. For instance, the external memory interface 50 can be based on a USB (Universal Serial Bus) interface, SD (Secure Digital) card interface, miniSD card interface, micro SD card interface, memory stick interface, etc. The external removable memory 51 can thus e.g. be a USB memory, an SD card, a miniSD card, a micro SD card, a memory stick, etc. In any case, the external memory interface 50 allows the processor 60 to gain access to external instructions 56 stored in the external removable memory 51.

The internal instructions 66, when executed by the processor 60, cause the control device 1 to provide access to the control interface 53 when the external instructions 56 are executed by the processor 60. The external instructions 56 are read from the external removable memory device 51. The external instructions 56 can be accessed directly and executed from the external memory device 51 or the external instructions can first be copied to internal memory 64/67 and executed from there. Optionally, the external instructions 56 are also provided access to the user interface device 52 and/or the network interface 62. Optionally, only a subset of the user interface device 52 is provided for the external instructions 56. For instance, the external instructions may be provided a panel covering the majority of the area of a touch screen, while a top section is reserved for certain fundamental and/or critical functions, controlled by the internal instructions 66, which always need to be available.

By allowing the external instructions 56 on the external removable memory 51 to access the control interface 53 and optionally the user interface device 52 and/or the network interface 62, great flexibility is achieved. The owner of the energy storage system can develop any suitable control scheme and provide this in the external instructions 56. The control scheme can easily be reprogrammed and provided on a new external removable memory 51 if needed.

Moreover, when the network interface 62 is made available for the external instructions 56, the external instructions 56 can communicate with a server as desired for additional flexibility. In other words, external information can thus be communicated using the network interface to/from the server. Significantly, the operator of the energy storage system 3 does not need to provide any separate external control device to execute the desired logic, since the external instructions 56 are simply loaded on the external removable memory 51 and connected to the control device 1, thus saving cost. Additionally, if the owner operates several energy storage systems 3, the external instructions 56 can be copied to several external removable memories 51, one for each control device of the respective energy storage systems 3.

Figure 3:
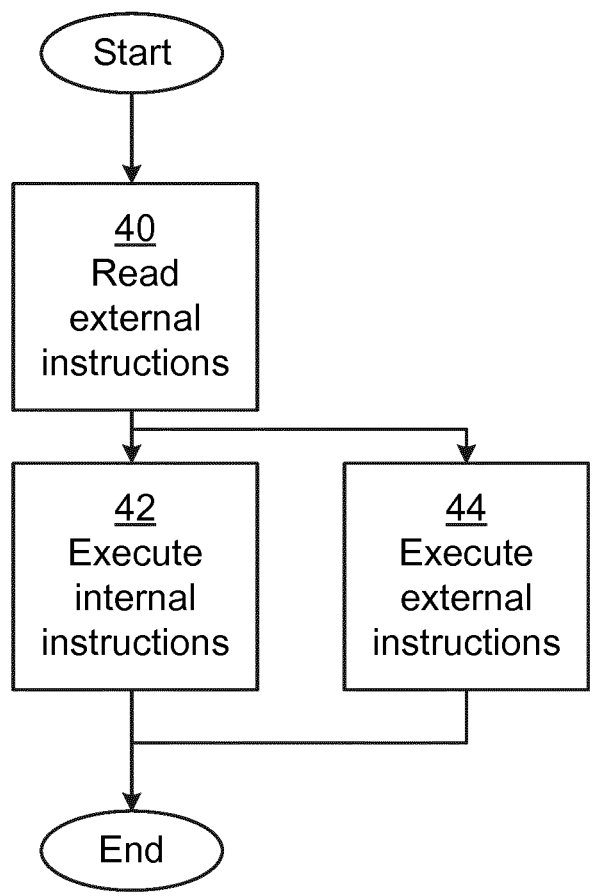
FIG. 3 is a flow chart illustrating embodiments of methods for controlling the energy storage system of FIG. 1, performed in the control device.

FIG. 3 is a flow chart illustrating embodiments of methods for controlling the energy storage system of FIG. 1, performed in the control device 1.

In a read external instructions step 40, external instructions 56 are read from the external removable memory via the external memory interface 50.

In an execute internal instructions step 42, internal instructions 66 from the internal memory 64 are executed to thereby provide access to the control interface 53, for controlling the energy storage system 3, for the external instructions 56. As explained above, the control interface 53 can comprise an interface to read parameters of the energy storage system 3 e.g. current configuration and/or measurements of voltage, current, frequency, power, temperature, etc., from any connected devices. Also, the control interface 53 can comprise an interface to set a set point for the energy storage system 3, e.g. active power P and/or reactive power Q.

Optionally, this step comprises providing access to the user interface device 52 of the control device 1 for the external instructions 56, providing a way for the external instructions to interact with a user of the control device 1.

Optionally, this step comprises providing access to the network interface 62 for the external instructions 56, providing even more flexibility for the operator of the energy storage system.

In an execute external instructions step 44, the external instructions 56 are executed, which are then given access to the control interface 53 and optionally the user interface device 52 and/or the network interface 62.

It is to be noted that the execute internal instructions step 42 and execute external instructions step 44 can be performed in parallel. Moreover, the read external instructions step 40 can optionally form part of the execute external instructions step 44.

Figure 4:
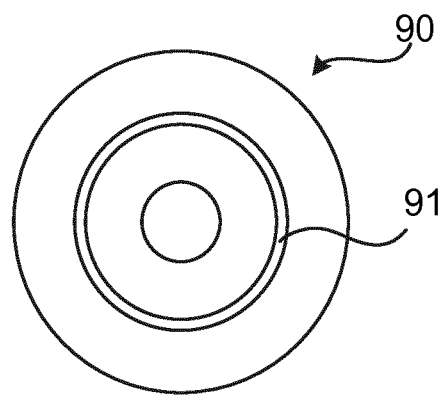
FIG. 4 shows one example of a computer program product comprising computer readable means.

FIG. 4 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 2. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A control device for controlling an energy storage system comprising an energy storage device, a bidirectional AC/DC converter, and a grid connection to an electrical power distribution grid, the control device including:
   a processor;
   an external memory interface configured to read external software instructions from an external removable memory device;
   a control interface configured to control the energy storage system;
   a user interface device comprising a screen, the screen comprising a first subset of screen space and a second subset of screen space; and
   an internal memory storing internal software instructions that, when executed by the processor, cause the processor to:
      provide access to only the first subset of screen space for the external software instructions;
      read the external software instructions from the external removable memory device; and
      execute the external software instructions to cause the control interface to:
         control power on the grid connection to be within a predetermined range of a target value;
         store power on the energy storage device in response to a first control parameter comprising at least one of an energy usage value, an energy cost value, or a power outage condition value; and consume power from the energy storage device in response to a second control parameter comprising at least one of an energy usage value, an energy cost value, or a power outage condition value.

2. The control device according to claim 1, wherein the internal software instructions further include instructions that, when executed by the processor, cause the processor to:
allow the external software instructions to access the user interface device; and
execute the external software instructions to control the user interface device.

3. The control device according to claim 2, wherein the internal software instructions include instructions that, when executed by the processor, cause the processor to allow the external software instructions to access the first subset of screen space of the screen to control the first subset of screen space.

4. The control device according to claim 2, further comprising a network interface;
wherein the internal software instructions further include instructions that, when executed by the processor, cause the processor to:
allow the external software instructions to access the network interface; and
cause the processor to execute the external software instructions to control the network interface.

5. The control device according to claim 2, wherein the control interface includes an interface to read parameters of the energy storage system.

6. The control device according to claim 2, wherein the control interface includes an interface to set a set point for the energy storage system.

7. The control device according to claim 1, further comprising a network interface;
wherein the internal software instructions further include instructions that, when executed by the processor, cause the control device to:
allow the external software instructions to access to the network interface; and
execute the external software instructions to control the network interface.

8. The control device according to claim 1, wherein the control interface includes an interface to read parameters of the energy storage system.

9. The control device according to claim 1, wherein the control interface includes an interface to set a set point for the energy storage system.

10. The control device according to claim 1, wherein the internal software instructions include instructions that, when executed by the processor, cause the control device to control the second subset of screen space of the display screen.

11. A method for controlling an energy storage system comprising an energy storage device, a bidirectional AC/DC converter, and a grid connection to an electrical power distribution grid, the method being performed in a control device of the energy storage system, the method comprising:
reading external software instructions from an external removable memory via an external memory interface;
executing internal software instructions from an internal memory to cause a processor to provide the external software instructions access to a control interface configured to control the energy storage system and a first subset of screen space of a user interface device, the user interface device comprising a second subset of screen space that is not accessible by the external software instructions; and
executing the external software instructions to cause the control interface to control the energy storage system.

12. The method according to claim 11, further comprising:
executing the internal software instructions from the internal memory to cause the processor to allow the external software instructions to access a user interface device; and
executing the external software instructions to control the user interface device.

13. The method according to claim 12, further comprising:
executing the internal software instructions from the internal memory to cause the processor to allow the external software instructions to access a network interface; and
executing the external software instructions to control the network interface.

14. The method according to claim 12, wherein the control interface includes an interface to read parameters of the energy storage system.

15. The method according to claim 11, further comprising:
executing the internal software instructions from the internal memory to cause the processor to allow the external software instructions to access a network interface; and
executing the external software instructions to control the network interface.

16. The method according to claim 11, wherein the control interface includes an interface to read parameters of the energy storage system.

17. The method according to claim 11, wherein the control interface includes an interface to set a set point for the energy storage system.

18. A non-transitory computer readable medium comprising a computer program for controlling an energy storage system comprising an energy storage device, a bidirectional AC/DC converter, and a grid connection to an electrical power distribution grid, the computer program including a computer program code which, when run on a control device of the energy storage system causes the control device to:
read external software instructions from an external removable memory via an external memory interface;
execute internal software instructions from an internal memory to cause a processor to allow the external software instructions to access a control interface configured to control the energy storage system and to access a first subset of screen space of a user interface device, the user interface device comprising a second subset of screen space that is not accessible by the external software instructions; and
execute the external software instructions to cause the control interface to control the energy storage system.

19. A computer program product comprising:
a computer program that causes a control device of an energy control system to:
read external software instructions from an external removable memory via an external memory interface;
execute internal software instructions from an internal memory to cause the processor to allow the external software instructions to access a control interface configured to control the energy control system and to access a first subset of screen space of a user interface device, the user interface device comprising a second subset of screen space that is not accessible by the external software instructions; and execute the external software instructions to:

control power on the grid connection to be within a predetermined range of a target value;

store power on the energy storage device in response to a first control parameter comprising at least one of an energy usage value, an energy cost value, or a power outage condition value; and consume power from the energy storage device in response to a second control parameter comprising at least one of an energy usage value, an energy cost value, or a power outage condition value; and a non-transitory computer readable medium on which the computer program is stored.

\* \* \* \* \*